(12) United States Patent
Kim et al.

(10) Patent No.: US 12,170,088 B2
(45) Date of Patent: *Dec. 17, 2024

(54) ELECTRONIC DEVICE AND CONTROLLING METHOD THEREOF

(71) Applicant: SAMSUNG ELECTRONICS CO., LTD., Suwon-si (KR)

(72) Inventors: Min-seok Kim, Anyang-si (KR); Min-ho Lee, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,130

(22) Filed: Jul. 7, 2023

(65) Prior Publication Data

US 2023/0352021 A1    Nov. 2, 2023

Related U.S. Application Data

(63) Continuation of application No. 17/145,541, filed on Jan. 11, 2021, now Pat. No. 11,721,341, which is a (Continued)

(30) Foreign Application Priority Data

Mar. 22, 2017   (KR) .................. 10-2017-0036242

(51) Int. Cl.
*G10L 15/00*    (2013.01)
*G06F 3/16*     (2006.01)
(Continued)

(52) U.S. Cl.
CPC .............. *G10L 15/22* (2013.01); *G06F 3/165* (2013.01); *G06F 3/167* (2013.01); *G10L 15/08* (2013.01);
(Continued)

(58) Field of Classification Search
CPC .......... G10L 15/22; G10L 15/32; G06F 3/167
See application file for complete search history.

(56) References Cited

U.S. PATENT DOCUMENTS 5,987,106 A    11/1999  Kitamura
9,544,633 B2    1/2017  Lee et al.
(Continued)

FOREIGN PATENT DOCUMENTS

CN    102945672 A    2/2013
CN    106465006 A    2/2017
(Continued)

OTHER PUBLICATIONS

U.S. Appl. No. 15/914,198, filed Mar. 7, 2018; Kim et al.
(Continued)

*Primary Examiner* — Daniel Abebe
(74) *Attorney, Agent, or Firm* — Nixon & Vanderhye P.C.

(57) ABSTRACT

An electronic device is provided. The electronic device according to an embodiment includes a microphone, a communicator comprising communication circuitry, and a processor configured to control the communicator to transmit a control command to an external audio device for reducing an audio output level of the external audio device in response to a trigger signal for starting a voice control mode being received through the microphone and to control the electronic device to operate in the voice control mode.

14 Claims, 7 Drawing Sheets

Related U.S. Application Data continuation of application No. 15/914,198, filed on Mar. 7, 2018, now Pat. No. 10,916,244.

(51) Int. Cl.
*G10L 15/08* (2006.01)
*G10L 15/22* (2006.01)
*G10L 15/30* (2013.01)

(52) U.S. Cl.
CPC .. *G10L 2015/088* (2013.01); *G10L 2015/223* (2013.01); *G10L 15/30* (2013.01)

(56) References Cited

U.S. PATENT DOCUMENTS

| | | | |
|---|---|---|---|
| 9,715,878 B2* | 7/2017 | Sims, III | G10L 15/32 |
| 9,830,924 B1 | 11/2017 | Degges, Jr | |
| 9,898,250 B1 | 2/2018 | Williams | |
| 10,062,382 B2 | 8/2018 | Lee et al. | |
| 10,678,495 B2 | 6/2020 | Kielak | |
| 10,891,946 B2 | 1/2021 | Pechanec | |
| 10,916,244 B2 | 2/2021 | Kim et al. | |
| 10,957,323 B2 | 3/2021 | Bae et al. | |
| 2003/0138118 A1 | 7/2003 | Stahl | |
| 2012/0215537 A1 | 8/2012 | Igarashi | |
| 2012/0226502 A1 | 9/2012 | Ouchi | |
| 2013/0279706 A1 | 10/2013 | Marti | |
| 2014/0167931 A1 | 6/2014 | Lee et al. | |
| 2014/0372109 A1 | 12/2014 | Iyer | |
| 2015/0019225 A1* | 1/2015 | Sims, III | G10L 15/32 704/254 |
| 2015/0206529 A1 | 7/2015 | Kwon et al. | |
| 2015/0213802 A1 | 7/2015 | Bae | |
| 2015/0222948 A1 | 8/2015 | Wang et al. | |
| 2016/0098991 A1 | 4/2016 | Luo et al. | |
| 2016/0226823 A1 | 8/2016 | Ansari et al. | |
| 2016/0267909 A1 | 9/2016 | Hanaoka | |
| 2017/0069323 A1 | 3/2017 | Bae et al. | |
| 2017/0076724 A1 | 3/2017 | Park et al. | |
| 2017/0090864 A1* | 3/2017 | Jorgovanovic | G10L 15/22 |
| 2017/0357478 A1* | 12/2017 | Piersol | G10L 15/22 |
| 2020/0068303 A1 | 2/2020 | Wilson | |

FOREIGN PATENT DOCUMENTS

| | | |
|---|---|---|
| EP | 2 897 126 A1 | 7/2015 |
| EP | 3 128 727 A1 | 2/2017 |
| KR | 10-2008-0096239 | 10/2008 |
| KR | 10-1193234 | 10/2012 |
| KR | 10-2013-0083371 A | 7/2013 |
| KR | 10-1517232 | 5/2015 |
| KR | 10-2017-0016760 A | 2/2017 |

OTHER PUBLICATIONS

Search Report mailed Jun. 14, 2018 in counterpart International Patent Application No. PCT/KR2018/002721.
Written Opinion mailed Jun. 14, 2018 in counterpart International Patent Application No. PCT/KR2018/002721.
Extended EP Search Report dated Aug. 30, 2019 for EP Application No. 18772601.3.
European Examination Report dated Apr. 23, 2021 for EP Application No. 18772601.3.
Korean Office Action dated Jun. 25, 2021 for KR Application No. 10-2017-0036242.
Korean Decision of Rejection dated Dec. 16, 2021 for KR Application No. 10-2017-0036242.
Chinese Office Action dated Nov. 21, 2022 for CN Application No. 201880019858.9.
India Examination Report dated Oct. 1, 2021 for IN Application No. 201947035411.
Extended European Search Report dated Sep. 20, 2023 for EP Application No. 23179740.8.

* cited by examiner

ELECTRONIC DEVICE AND CONTROLLING METHOD THEREOF

CROSS-REFERENCE TO RELATED APPLICATION

This application is a Continuation of U.S. application Ser. No. 17/145,541, filed Jan. 11, 2021, which is a Continuation of U.S. application Ser. No. 15/914,198, filed Mar. 7, 2018 (now U.S. Pat. No. 10,916,244), which claims priority to Korean Application No. 10-2017-0036242, filed Mar. 22, 2017, the entire contents of which are all hereby incorporated herein by reference in their entireties.

BACKGROUND

1. Field

The present disclosure relates generally to an electronic device and a controlling method thereof, and for example, to an electronic device that performs an operation corresponding to a user voice and a controlling method thereof.

2. Description of Related Art

With the development of network communication technology and voice recognition technology, it becomes possible for the user to control operations of various kinds of electronic devices connected via the network by voice. For example, a user utters a voice command to an electronic device including a voice recognition function in Internet of Things (IoT) environment or home network environment and thereby controls the operation of the electronic device or the operation of various kinds of devices connected to the electronic device.

However, when an audio device such as a speaker or a TV outputs sounds in the vicinity of the electronic device including the voice recognition function, a voice recognition rate is reduced, and thus the devices are not well controlled by user voice.

To address the above problem, beam forming technology using a microphone array has been developed and applied, but there is a limit in ensuing a voice recognition function due to the noise of neighboring devices.

Accordingly, for the use of voice-based service provided in the IoT environment or the home network environment in the home or in the office, a technique for preventing and/or reducing a low voice recognition performance caused by various kinds of audio sources is in high demand.

SUMMARY

An aspect of the example embodiments relates to providing an electronic device for enhancing a voice recognition function for the use of the voice-based service while an audio device outputs audio sounds and a controlling method thereof.

According to an example embodiment, an electronic device is provided, the electronic device including a microphone, a communicator comprising communication circuitry, and a processor configured to, in response to a trigger signal for starting a voice control mode being received through the microphone, control the communicator to transmit a control command for reducing an audio output level of an external audio device to the external audio device and to control the electronic device to operate in the voice control mode.

The processor may be further configured to, in response to a user voice being input through the microphone in the voice control mode, control the electronic device based on the user voice and to control the communicator to transmit a control command for increasing the audio output level of the external audio device to the external audio device.

The processor may be further configured to, when a predetermined period of time passes after the voice control mode starts, control the communicator to transmit a control command for increasing the audio output level of the external audio device to the external audio device.

The processor may be further configured to receive information on the audio output level of the external audio device through the communicator, and, if the audio output level of the external audio device is greater than a predetermined level, to transmit the control command to the external audio device.

The processor may be further configured to, in response to an audio signal output from the external audio device being received through the microphone, determine a magnitude of the audio signal, and, if the magnitude of the audio signal is greater than a predetermined level, to transmit the control command to the external audio device.

The electronic device may further include a display, wherein the processor is further configured to, after a mode of the electronic device is changed to the voice control mode, control the display to display a guide GUI for guiding a user to utter a voice for controlling an external device connected to the communicator and/or the electronic device.

The electronic device may further include a speaker, wherein the processor is further configured to, in response to the trigger signal being received through the microphone while the speaker outputs an audio signal, reduce an output level of the speaker.

The communicator may be connected to another electronic device, and the processor may be further configured to, in response to the trigger signal being received through the microphone, control the communicator to transmit a control command to the another electronic device for reducing an audio output level of an audio device connected to the another electronic device.

The communicator may be connected to another electronic device, and the processor may be further configured to, in response to the trigger signal being received through the microphone, receive recognition accuracy for the trigger signal recognized by the another electronic device through the communicator, to compare the recognition accuracy with recognition accuracy for the trigger signal recognized by the electronic device, and, if the recognition accuracy of the another electronic device is lower than the recognition accuracy of the electronic device, to transmit the control command to the external audio device.

The processor may be further configured to, in response to a control command for starting the voice control mode being received from a remote control device through the communicator, control the communicator to transmit the control command for reducing the audio output level of the external audio device to the external audio device.

According to an example embodiment, a method for controlling an electronic device is provided, the method including receiving a trigger signal for starting a voice control mode through a microphone, and transmitting a control command for reducing an audio output level of an external audio device connected to the electronic device to the external audio device in response to the trigger signal, and changing a mode of the electronic device to the voice control mode.

The method further includes controlling the electronic device based on a user voice in response to the user voice being input through the microphone in the voice control mode, and transmitting a control command for increasing the audio output level of the external audio device to the external audio device.

The method further includes transmitting a control command for increasing the audio output level of the external audio device to the external audio device when a predetermined period of time passes after the voice control mode starts.

The transmitting of the control command to the external audio device and the changing of the mode to the voice control mode may include receiving information on the audio output level of the external audio device, and transmitting the control command to the external audio device if the audio output level of the external audio device is greater than a predetermined level.

The transmitting of the control command to the external audio device and the changing of the mode to the voice control mode may further include determining a magnitude of an audio signal in response to the audio signal output from the external audio device being received through the microphone, and transmitting the control command to the external audio device if the magnitude of the audio signal is greater than a predetermined level.

The method may further include displaying a guide GUI for guiding a user to utter a voice for controlling an external device connected to the electronic device and/or the electronic device after the mode of the electronic device is changed to the voice control mode.

The method may further include, reducing an output level of a speaker in response to the trigger signal being received through the microphone while the speaker provided in the electronic device outputs an audio signal.

The electronic device may perform communication with another electronic device, and the method may further include, transmitting a control command to the another electronic device for reducing an audio output level of an audio device that performs communication with the another electronic device in response to the trigger signal being received through the microphone.

The electronic device may further include a first microphone and perform communication with another electronic device that performs communication with at least one other external device, the method further include, receiving voice recognition accuracy for the predetermined user voice received through the first microphone from the another electronic device, and comparing the received voice recognition accuracy with voice recognition accuracy for the predetermined user voice received through a second microphone of the electronic device, and the transmitting of the control command to the external audio device may include, if the voice recognition accuracy for the predetermined user voice received through the second microphone is higher, transmitting a control command for reducing an output level of an audio signal output from an audio device from among the external devices to the audio device.

The electronic device may perform communication with a remote control device that controls the electronic device, and the transmitting of the control command to the audio device may further include, in response to a predetermined signal being received from the remote control device as a predetermined button provided in the remote control device is selected, transmitting the control command for reducing the output level of the audio signal output from the audio device from among the external devices to the audio device.

According to the above-described various example embodiments, optimal voice-based service may be provided while an audio device outputs audio sounds.

BRIEF DESCRIPTION OF THE DRAWINGS

The above and other aspects, features and attendant advantages of the present disclosure will be more apparent and readily appreciated from the following detailed description, taken in conjunction with the accompanying drawings, in which like reference numerals refer to like elements, and wherein.

DETAILED DESCRIPTION

In describing the present disclosure, if it is determined that the detailed description of the related art will unnecessarily obscure the gist of the present disclosure, a detailed description thereof may be omitted. Further, the suffix "part" for the elements used in the following description is provided for ease of description, and does not have a meaning or role that distinguishes itself.

The terminology used herein is used to describe various example embodiments, and is not intended to limit and/or restrict the present disclosure. Singular forms are intended to include plural forms unless the context clearly indicates otherwise.

The term such as "first" and "second" used in various example embodiments may modify various elements regardless of an order and/or importance of the corresponding elements, and does not limit the corresponding elements. The terms are used simply to distinguish one element from other elements.

It will be further understood that terms such as "including", "including", "including", "having," or the like, are intended to indicate the existence of the features (e.g. numbers, function, operations, components, or the like) disclosed in the present disclosure, and are not intended to preclude the possibility that one or more other features may exist or may be added.

In an example embodiment, 'a module', 'a unit', or 'a part' may perform at least one function or operation, and may be realized as hardware, such as a processor or integrated circuit, software that is executed by a processor, or any combination thereof. In addition, a plurality of 'modules', a plurality of 'units', or a plurality of 'parts' may be integrated into at least one module or chip and may be realized as at least one processor (not shown) except for 'modules', 'units' or 'parts' that should be realized in a specific hardware.

Figure 1:
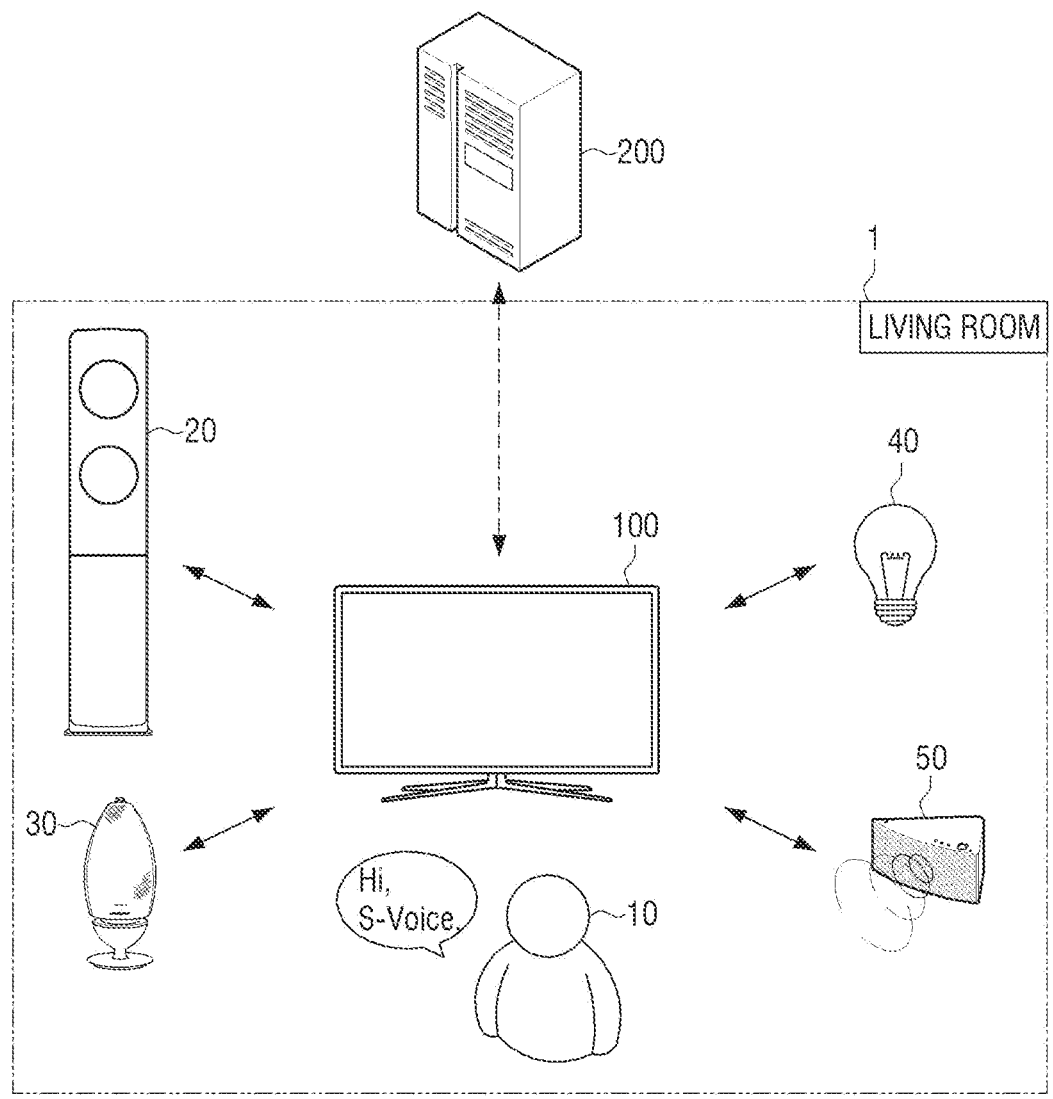
FIG. 1 is a diagram illustrating a voice recognition environment through an electronic device according to an embodiment of the present disclosure.

FIG. 1 is a diagram illustrating an example voice recognition environment through an electronic device according to an example embodiment of the present disclosure. Referring to FIG. 1, a voice recognition environment 1 may include an electronic device 100 and a plurality of external devices 20, 30, 40 and 50.

The electronic device 100 may be connected to the plurality of external devices 20 to 50 by various kinds of communication methods and control the operations of the plurality of external devices 20 to 50. For example, the electronic device 100 may have a voice recognition function and thereby control its own operation or the operations of the plurality of external devices 20 to 50 based, for example, on a voice of a user 10.

However, having a voice recognition function does not necessarily mean that the electronic device 100 includes all elements for voice recognition. For example, it may be that the electronic device 100 includes the voice recognition function even when the electronic device 100 may perform only a pre-processing such as deleting of noise of an audio signal received through a microphone (not shown), and the further processing for voice recognition is performed by communicating with a voice recognition server 200.

The electronic device 100 may be implemented as various types of devices. For example, the examples of the electronic device 100 may include, for example, and without limitation, a smart TV, a smart refrigerator, a smart phone, an access point, an On-Board Unit (OBU) device of a vehicle, a smart speaker, a notebook, a desktop PC, a tablet, or the like, but the present disclosure is not limited thereto.

The plurality of external devices 20 to 50 may be connected to the electronic device 100 through various kinds of communication methods and the operations of the plurality of external devices 20 to 50 may be controlled by the electronic device 100. Therefore, the external devices 20 to 50 and the electronic device 100 may create an IoT environment or a home network environment in the home or in the office. The plurality of external devices 20 to 50 may include at least one of audio devices 30 and 50 that output audio signals.

Since there is no limitation to the kinds of objects in the IoT environment, the kinds of external devices are not limited as well. For example, as illustrated in FIG. 1, examples of the external device may be an air conditioner 20, a 360 degree speaker 30, a smart light 40, an MP3 speaker 50, or the like, or devices such as a fan, a washing machine, a microwave oven, a door lock, a sound bar, a home theater, a smart phone, a TV, a refrigerator, or the like. Examples of an external device may be any type of device as long as the external device is connected to and controlled by the electronic device 100.

FIG. 1 illustrates the voice recognition environment 1 in, for example, a living room. Since the electronic device 100 includes a voice recognition function, the user 10 may utter a voice command and thereby control the operation of the electronic device 100 or the operations of the external devices 20 to 50 through the electronic device 100.

For example, in response to a predetermined voice of the user 10 being received, the electronic device 100 may operate in a voice control mode. FIG. 1 illustrates an example case where the predetermined voice is "Hi, S-Voice". Therefore, when the user utters "Hi, S-Voice" and the predetermined voice is received, the electronic device 100 may operate in the voice control mode.

In response to a user voice being received in the voice control mode, the electronic device 100 may recognize the received user voice and perform a control command corresponding to the recognized voice. Therefore, when the electronic device 100 enters the voice control mode, the user 10 may utter a user voice for controlling the operation of the electronic device 100 or the operation of at least one of the plurality of external devices 20 to 50. In FIG. 1, when the user utters "turn on the light", the electronic device 100 may receive and recognize the user voice, transmit a control command for turning on a smart light 40 to the smart light 40 and perform an operation corresponding to the user voice.

In the voice recognition environment 1, when the electronic device 100 enters the voice control mode while the audio devices 30 and 50, among the plurality of external devices 20 to 50, output audio signals, the voice recognition function of the electronic device 100 may be affected by noise nearby. When the electronic device 100 operates in the voice control mode and the audio devices 30 and 50 nearby the electronic device output audio signals, the voice recognition rate of the electronic device 100 may be reduced compared to the case where the audio devices 30 and 50 do not output audio signals.

In other words, although a user utters a control command for controlling the electronic device 100 or the external devices 20 to 50, there is a likelihood that the electronic device 100 may not clearly recognize a voice control command of the user due to the audio signals output from the audio devices 30 and 50.

To address the above problem, the electronic device 100 according to an embodiment of the present disclosure, in response to an audio signal corresponding to a predetermined user voice being received, may transmit control commands for reducing output levels of audio signals output from the audio devices 30 and 50, among the external devices 20 to 50 communicably connected to the electronic device 100, to the audio devices 30 and 50 and then operate in the voice control mode, thereby providing a more optimal voice-based service although the audio devices 30 and 50 output audio sounds in the vicinity of the electronic device 100.

Referring to FIG. 1, when a 360 degree speaker 30 and an MP3 speaker 50 connected to a smart TV 100 output music sound at a high level in the vicinity of the smart TV 100 or the user 10, the smart TV 100 that recognizes a trigger word "Hi, S-Voice" uttered by the user 10 may transmit control commands for reducing output levels of audio signals such as a volume-down command or a mute command to the 360 degree speaker 30 and the MP speaker 50, reduce the volume level of the music and operate in the voice control mode.

Accordingly, when the user utters a control command for controlling the electronic device 100 or the external devices 20 to 50, the electronic device 100 may recognize a voice control command of the user at the optimal conditions without deteriorating the performance of voice recognition caused by the output of the audio devices 30 and 50.

Figure 2:
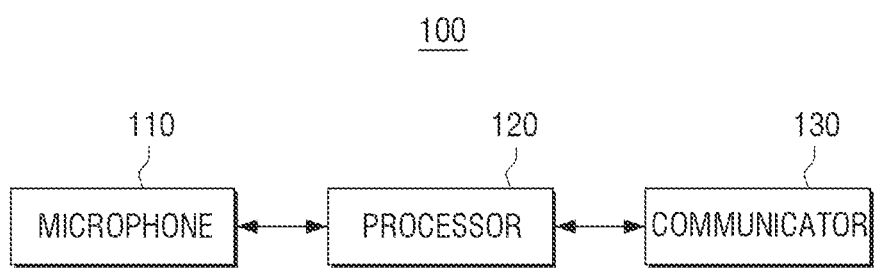
FIG. 2 is a block diagram illustrating an example configuration of an electronic device according to an embodiment of the present disclosure.

FIG. 2 is a block diagram illustrating an example configuration of an electronic device according to an embodiment of the present disclosure. Referring to FIG. 2, the electronic device 100 may include a microphone 110, a processor (e.g., including processing circuitry) 120 and a communicator (e.g., including communication circuitry) 130.

The microphone 110 may receive various audio signals in the form of sound wavers, convert the audio signals into electronic signals and transmit the converted audio signals to the processor 120. The audio signals received through the microphone 110 may include voice of the user 10, various audio signals output from the audio device in the vicinity of the electronic device 100, noise nearby, etc.

The microphone 100 may be embodied with one ore more microphones and embodied integrally with or separately from the electronic device 100. A detachable microphone refers to a microphone separated from but connected to the electronic device 100 in a wired or wireless manner.

The communicator 130 may include various communication circuitry and be controlled by the processor 120 and perform communication with various external servers or terminals by various communication methods. For example, the communicator 110 may perform communication with the voice recognition server 200 for recognizing a voice of the user 10. The voice recognition server 200 may be a cloud server, but is not limited thereto.

The communicator 110 may transmit and receive various control commands and information by performing communication with various terminals in the vicinity of the electronic device 100, e.g., the external devices 20 to 50. The communicator 110 may perform communication with the external devices 20 to 50 in the vicinity of the electronic device 100 and create IoT environment or home network environment, but the present disclosure is not limited thereto.

The processor 120 may include various processing circuitry and control overall operations of the electronic device 100. For example, the processor 120, in response to an audio signal corresponding to a predetermined voice of the user 10 being received through the microphone 110, may control the communicator 110 to transmit control commands for reducing output levels of audio signals output from the audio devices 30 and 50, among the external devices 20 to 50 that perform communication with the electronic device 100, to the audio devices and operate in the voice control mode.

The processor 120 may determine whether an audio signal received through the microphone 110 corresponds to the audio signal corresponding to the predetermined voice. For example, the processor 120 may perform voice recognition by processing the audio signal received through the microphone 110 and determine whether the recognized voice is the predetermined voice. The voice recognition may be performed by the processor 120 or the voice recognition server 200. When the voice recognition is performed by the voice recognition server 200, the processor 120 may perform only a pre-processing of eliminating noise of the audio signal received through the microphone 110, control the communicator 110 to transmit the pre-processed audio signal to the voice recognition server 300 and receive a voice recognition result from the voice recognition server 200 through the communicator 110.

The predetermined voice may refer, for example, to a user voice for allowing the electronic device 100 to enter a voice control mode and may be user's utterance of a word or a sentence set by the manufacturer of the electronic device 100 or the user. Since the predetermined voice may trigger the voice control mode of the electronic device 100, the predetermined voice may be referred to as a trigger command.

As a result of voice recognition, if it is determined that the audio signal corresponding to the predetermined voice is received, the processor 120 may transmit control commands for reducing output levels of audio signals output from the audio devices 30 and 50 in the vicinity of the electronic device 100 to the audio devices 30 and 50 and operate in the voice control mode.

The processor 120, in response to a predetermined voice of the user 10 being received through the microphone 100, may determine the audio devices 30 and 50, among the external devices 20 to 50 connected to the electronic device 100. For example, the processor 120 may receive information on each of the external devices 20 to 50 in the communication connection process with the external devices 20 to 50 for creating the IoT environment or the home network environment. The information on the external devices 20 to 50 may include identification information such as the type, name, shape, MAC address, etc. of the external device, and the processor 120 may determine which one of the external devices 20 to 50 outputs an audio signal based on the identification information. According to another embodiment, the processor 120, in response to a predetermined voice of the user 10 being received, may request identification information to the external devices 20 to 50 in the vicinity of the electronic device 100 through the near field communication method, and in response to the identification information being received, determine the audio devices 30 and 50 from among the external devices 20 to 50 based on the received information.

Accordingly, the processor 120 may transmit control commands for reducing output levels of audio signals to the audio devices 30 and 50, among the external devices 20 to 50.

The processor 120 may determine at least one audio device to which a control command for reducing an output level from among the plurality of audio devices 30 and 50 based on audio signals of the plurality of audio devices 30 and 50 received through the microphone 110 or output level information of the plurality of audio devices 30 and 50 received through the microphone 110 and control the communicator 110 to transmit a control command for reducing an output level to the determined audio device.

For example, the processor 120 may control the communicator 110 to request the transmission of the information on the output levels of audio signals output from the audio devices 30 and 50 to the audio devices 30 and 50. Accordingly, in response to receiving information on the audio signal output level from each of the audio devices 30 and 50, the processor 120 may recognize the output levels of the audio signals output from the audio devices 30 and 50. However, the present disclosure is not limited thereto, but the processor 120 may request the transmission of the information on the output level of the audio signal to each of the audio devices 30 and 50 at a predetermined interval and recognize the output level of the audio signal of each of the audio devices 30 and 50. The information on the output level of the audio signal may be volume information of the audio signals output from the audio devices 30 and 50, but the present disclosure is not limited thereto.

Since the processor 120 may determine the audio signal output level of each of the audio devices 30 and 50 in the vicinity of the electronic device 100, the processor 120 may determine an audio device of which an audio signal output level is greater than a predetermined level, among the audio devices 30 and 50, as an audio device to which a control command for reducing an output level of the audio signal is transmitted, and transmit the control command for reducing the output level of the audio signal to the audio device. There is no need to reduce the output level of the audio device that outputs a low-level audio signal that does not interfere with the voice recognition of the user 10 or the output level of the audio device that does not output an audio signal.

In response to audio signals output from the audio devices 30 and 50 being received through the microphone 110, the processor 120 may determine information on the direction to receive an audio signal and the intensity of the audio signal based on the received audio signal. For example, when the microphone 110 is an array-microphone, the processor 120 may analyze a phase of the audio signal received through each microphone, measure the intensity of the audio signal and thereby determine the direction to receive each audio signal and the intensity of the audio signal.

Accordingly, the processor 120 may determine an audio device that outputs an audio signal at predetermined intensity or more as an audio device to which a control command for reducing an output level of the audio signal is transmitted and transmit the control command for reducing the output level of the audio signal to the audio device. The processor 120 may transmit a control command for reducing an output level of an audio signal to an audio device outputting the audio signal at a predetermined intensity or more by using pre-stored information on the positions or the directions of the audio devices 30 and 50 based on the electronic device 100 or by using a directional communication method.

According to an embodiment, the processor 120 may transmit a control command for reducing an output level of an audio signal to an audio device at a shorter distance from the user 10 who utters a predetermined user voice than a predetermined distance, among the audio devices 30 and 50. For example, the processor 120 may specify the position of the user 10 and the audio device located within a predetermined distance from the user 10 when the predetermined user voice is received by using a camera (not shown) and transmit the control command for reducing the output level of the audio signal to the specific audio devices by using identification information, position information and direction information of the audio devices 30 and 50 which are pre-stored. As described below with reference to FIGS. 4 and 5, the processor 120 may exchange voice recognition accuracy for the predetermined user voice with another electronic device, and if voice recognition accuracy of the electronic device 100 is higher than voice recognition accuracy of another electronic device, determine that the electronic device 100 is closer to the user 10 than another electronic device and control the communicator 130 to transmit the control commands for reducing the output levels of the audio signals to the audio devices 30 and 50 connected to the electronic device 100.

According to an embodiment, the processor 120 may determine an audio device to which the control command for reducing the output level of the audio signal is transmitted by combining information on the audio signal output levels of the audio devices 30 and 50 and information on the distances between the audio devices 30 and 50 and the user 10 who utters the predetermined user voice. For example, the processor 120 may transmit a control command for reducing an output level of an audio signal to an audio device having an audio signal output level greater than a predetermined level and located within a predetermined distance from the user 10.

The control command for reducing the output level of the audio signal may be a control command for reducing an output level by a predetermined level than the output levels of the audio signals which the audio devices 30 and 50 currently output. For example, the control command may be a control command for reducing a volume level by 3 (three) levels or a mute command, but is not limited thereto.

The processor 120 which transmits the control commands for reducing the output levels of the audios signal to the audio devices 30 and 50 may control the electronic device 100 to operate in the voice control mode.

The processor 120 may control the electronic device 100 to operate in the voice control mode right after the control commands for reducing the output levels of the audio signals are transmitted to the audio devices 30 and 50. According to an embodiment, the processor 120 may control the electronic device 100 to operate in the voice control mode after the output levels of the audio signals of the audio devices 30 and 50 are reduced as the control commands are transmitted.

When the processor 120 controls the electronic device 100 to operate in the voice control mode after the output levels of the audio signals are reduced, the processor 120 may control the electronic device 100 to operate in the voice control mode after the changed audio signal output level information is received from the audio devices 30 and 50 in response to the control command for reducing the output level of the audio signal.

The voice control mode may be a mode where the electronic device 100 controls the operation of the electronic device 100 or the operations of the external devices 20 to 50 connected to the electronic device 100 according to a user voice. Therefore, in response to an audio signal corresponding to a user voice for controlling the electronic device 100 or an audio signal corresponding to a user voice for controlling the external devices 20 to 50 being received through the microphone 110 in the voice control mode, the processor 120 may control the operation of the electronic device 100 based on the audio signal corresponding to the user voice.

For example, in response to an audio signal corresponding to a user voice for controlling the electronic device 100 or the external devices 20 to 50 being received, the processor 120 may perform voice recognition by processing the received audio signal and perform a control command corresponding to the recognized user voice. For example, when the electronic device 100 is a TV, in response to an audio signal corresponding to a user voice "channel up" being received, the processor 120 may perform a channel up operation, which is a control command corresponding to the user voice "channel up" through voice recognition. According to another embodiment, when the user utters "turn off the 360 degree speaker 30", the processor 120 may determine a device to be controlled and a control command by performing voice recognition, transmit a turn-off command to the 360 degree speaker 30 and thereby turn off the power of the 360 degree speaker 30. The voice recognition may be performed by the processor 120 or the voice recognition server 200 according to an embodiment.

As described above, it is understood that the voice recognition function of the electronic device 100 may be activated even before the electronic device 100 operates in the voice control mode. In other words, the predetermined user voice may be recognized by the electronic device 100 before the electronic device 100 operates in the voice control mode. However, if another user voice other than the predetermined user voice, for example, a user voice for controlling the electronic device 100 or the external devices 20 to 50 is received, the corresponding operation may not be performed.

According to an embodiment, the processor 120 may perform the operation according to the user voice in the voice control mode and control the communicator 110 to transmit control commands for increasing output levels of audio signals output from the audio devices 30 and 50 to the audio device 30 and 50.

In other words, after the completion of the operation according to the user voice, the output levels of the audio signals of the audio devices 30 and 50, which are reduced for the optimal user voice recognition in the voice control mode, may restore to the previous output levels. However, an embodiment of the present disclosure is not limited to the case where the output level is restored to its original level before reduced.

According to another embodiment, even when a user voice (e.g. a user voice for controlling the electronic device 100 or the external devices 20 to 50) is received through the microphone 110 during a predetermined period of time after the electronic device enters the voice control mode, the processor 120 may control the communicator 110 to transmit the control commands for increasing the output levels of the audio signals output from the audio devices 30 and 50 to the audio devices 30 and 50.

When the control command is performed according to the user voice for controlling the operation of the audio device such as "turn off the 360 degree speaker 30", although the processor 120 transmits a control command for increasing the output level of an audio signal to the 360 degree speaker 30, of course, the corresponding operation may not be performed. In other words, when the user operates a power or a volume of the audio devices 30 and 50 by voice in the voice control mode, the processor 120 may not transmit the control command for increasing the output level of the audio signal to the audio devices 30 and 50 of which the power or volume is operated according to the user voice in the voice control mode. According to an embodiment, although the processor 120 transmits the control command for increasing the output level of the audio signal, the audio devices 30 and 50 may not perform the corresponding operation.

Figure 3:
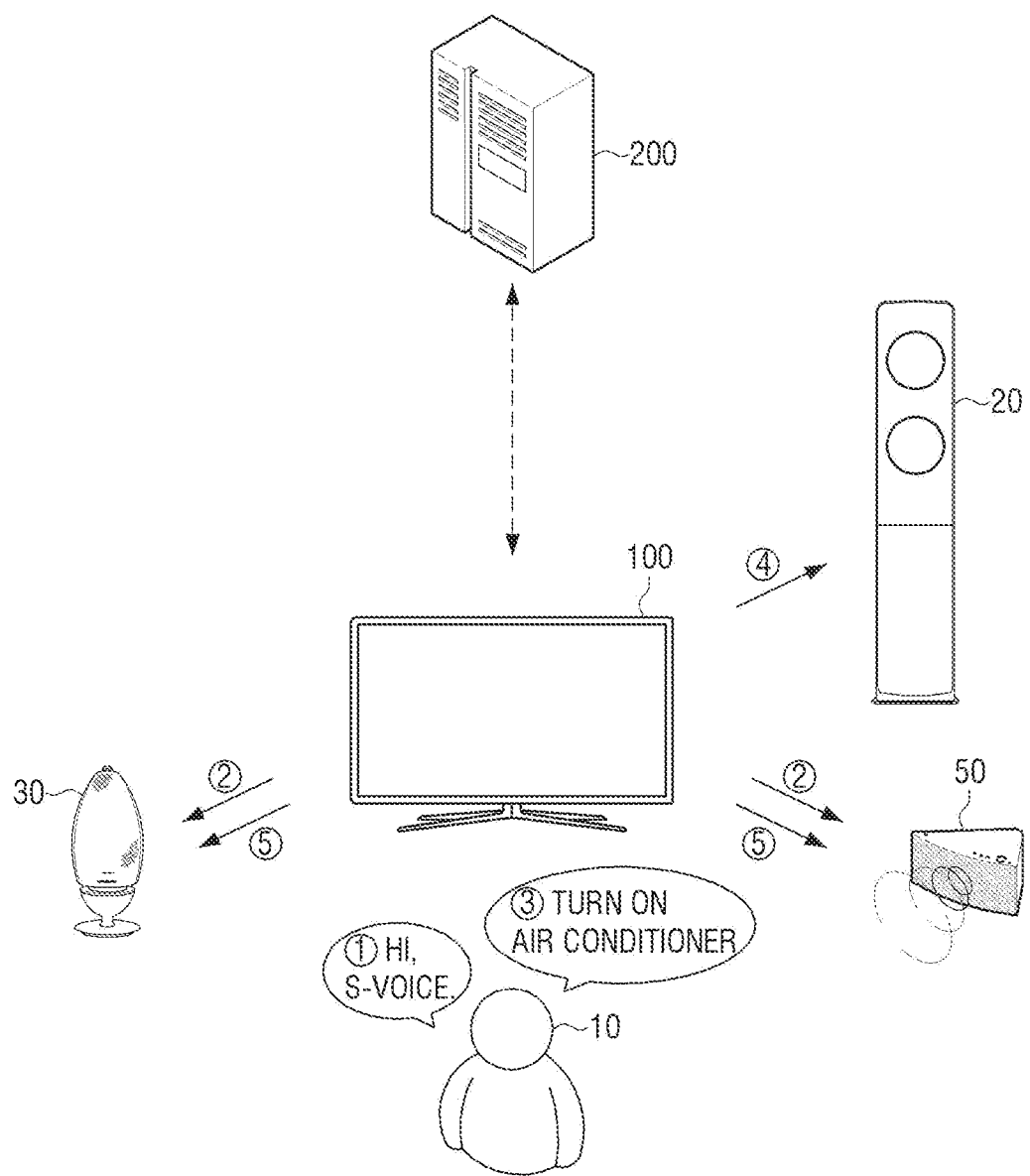
FIG. 3 is diagram illustrating an example operation of an electronic device according to an embodiment of the present disclosure.

FIG. 3 is a diagram illustrating an example operation of an electronic device according to an example embodiment of the present disclosure. Referring to FIG. 3, the electronic device 100 and the external devices 20, 30 and 50 may create the IoT environment, and the 360 degree speaker 30 and the MP speaker 50 may output audio signals. The 360 degree speaker 30 may output audio signals less than a predetermined level, and the MP3 speaker 50 may output audio signals greater than a predetermined level. In FIG. 3, ① to ⑤ shows the voice utterance of the user 10 and the operation order of the electronic device 100 corresponding thereto.

Referring to FIG. 3, when the user 10 utters the predetermined user voice "Hi, S-Voice", the electronic device 100 may receive an audio signal corresponding to "Hi, S-Voice" through the microphone 110. Accordingly, the processor 120 may perform various pre-processing and voice recognition of the received audio signals and determine whether the recognized voice is a predetermined user voice.

Since "Hi, S-Voice" is a predetermined user voice, the processor 120 may transmit control commands for reducing output levels of the audio signals to the audio devices 30 and 50 and control the electronic device 100 to operate in the voice control mode. According to an embodiment, the processor 120 may control the electronic device 100 to operate in the voice control mode after transmitting a control command for reducing the output level or a mute command only to the MP3 speaker 50 that outputs audio signals at a predetermined level or more.

Accordingly, the audio signal output levels of the audio devices 30 and 50 may be reduced or may disappear, and thus the user 10 may utters a user voice "turn on the air conditioner" for controlling the operation of the air conditioner 20 at the optimal conditions for voice recognition.

In response to an audio signal corresponding to the user voice "turn on the air conditioner" being received through the microphone 100, the processor 120 may perform voice recognition of the received audio signal to recognize "turn on the air conditioner" and control the communicator 130 to transmit a control command for turning on the power of the air conditioner 20 to the air conditioner 20.

Accordingly, the power of the air conditioner 20 may be turned on, and according to an embodiment, the processor 120 may transit the control commands for increasing the output levels to the audio devices 30 and 50 and control the audio devices 30 and 50 to restore to the output levels of the audio signals to the output levels before reducing according to the control commands for reducing the output levels of the audio signals.

A predetermined user voice or a user voice for controlling the electronic device 100 or at least one of the external devices 20 to 50 may be recognized by the electronic device 100 or the combination of the electronic device 100 and the voice recognition server 200.

Figure 4:
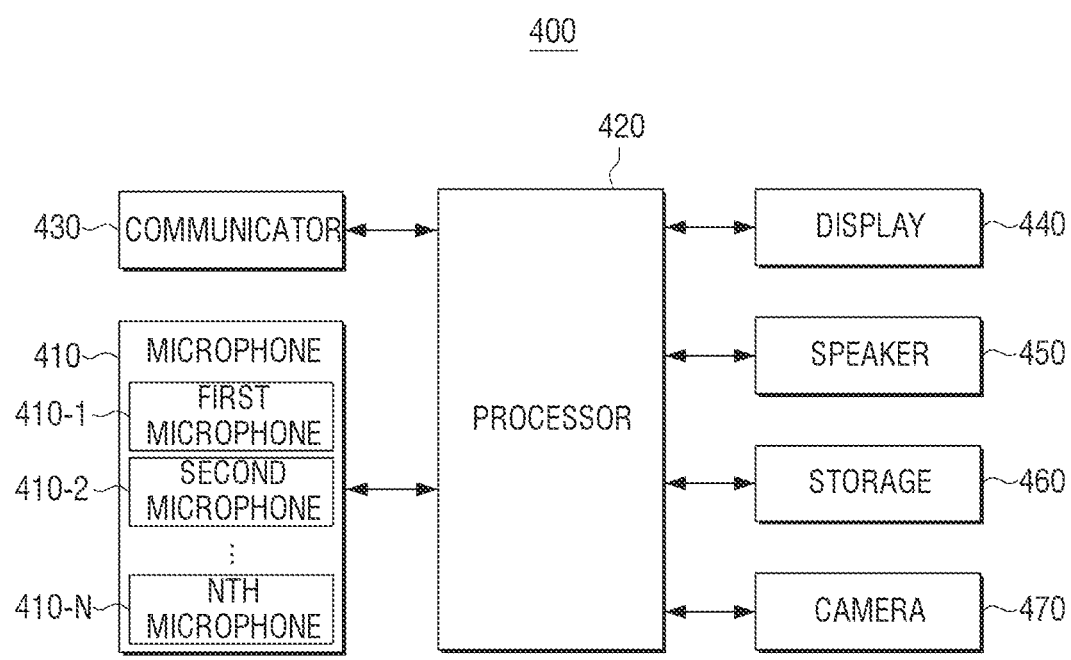
FIG. 4 is a block diagram illustrating an example configuration of an electronic device according to another embodiment of the present disclosure.

FIG. 4 is a block diagram illustrating an example configuration of an electronic device according to another embodiment of the present disclosure. Referring to FIG. 4, an electronic device 400 may include a microphone 410, a processor (e.g., including processing circuitry) 420, a communicator (e.g., including communication circuitry) 430, a display 440, a speaker 450, a storage 460 and a camera 470. In the description of the electronic device 400 of FIG. 4, the repetitive description regarding the configuration of the electronic deice 100 in FIG. 2 may not be repeated here.

The microphone 410 may collect audio signals generated from various external sound sources. The microphone 410 may include, for example, and without limitation, a plurality of microphones such as a first microphone 410-1, a second microphone 410-2, an Nth microphone 410-N, etc. and according to an embodiment, the microphone 410 may be embodied as an array-microphone (e.g., microphone-array, multi-channel microphone, multiple microphone, or the like)

The microphone 410 may, for example, and without limitation, be at least one of a dynamic microphone, a condenser microphone, a piezoelectric microphone using a piezoelectric phenomenon, a carbon microphone using contact resistance of carbon particles, a (non-directional) pressure microphone that generates an output proportional to a sound pressure, and a bi-directional microphone that generates an output proportional to a sound pressure, or the like. However, the present disclosure is not limited thereto.

The communicator 430 may include various communication circuitry and be controlled by the processor 120 and perform communication with the voice recognition server 200 and the external devices 20 to 50 through various communication methods. According to an embodiment, the processor 420 may perform communication with another electronic device that performs communication with at least one external device, or with a remote control device (not shown) which controls the electronic device 100.

The communicator 430 may include various communication circuitry, such as, for example, and without limitation, at least one of Near Field Communication module (not shown) and wireless LAN communication module (not shown), or the like. The Near Field Communication module (not shown) may be a communication module that wirelessly performs data communication with an external device located at a short distance, for example, a Bluetooth module, a ZigBee module, a Near Field Communication (NFC) module, an infrared communication module, and the like.

The wireless LAN communication module (not shown) may be a module connected to an external network according to a wireless communication protocol such as WiFi, IEEE, or the like to communicate with an external server or an external device.

In addition, according to an embodiment, the communicator 430 may further include mobile communication modules including communication circuitry that connect to a mobile communication network according to various mobile communication standards such as 3rd Generation (3G), 3rd Generation Partnership Project (3GPP), Long Term Evolution (LTE), and the like and further include a wired communication module (not shown) in accordance with communication standards such as High-Definition Multimedia Interface (HDMI), Universal Serial Bus (USB), Institute of Electrical and Electronics Engineers (IEEE) 1394, RS-232, RS-422, RS-485, Ethernet, or the like.

The storage 460 may store operation system (O/S), various programs and data for operating the electronic device 400. For example, the storage 460 may include an Speech To Text (STT) engine for voice recognition. The STT engine may be a module for converting an audio signal corresponding to a user voice into text, and thus the STT engine may convert a voice signal into text by using various STT algorithms publicly known in the art.

For example, the STT engine may detect a user's voice interval in an audio signal collected through the microphone 410 and extract a feature vector through, for example, and without limitation, a Linear Predictive Coefficient technique, a Cepstrum technique, a Filter Bank Energy technique, and a Mel Frequency Cepstral Coefficient (MFCC) technology, or the like. The extracted feature vector may include Zero Crossing Ratio (ZCR), Pitch, Formant, and the like, but is not limited thereto. Accordingly, the STT engine may apply the extracted feature vector to various reference models generated through, for example, and without limitation, a Vector Quantization (VQ) technique, Hidden Markov Model (HMM) technique, a Dynamic Time Warping (DTW) technique, or the like, and convert a user voice into text. The STT engine measure the similarity of the extracted feature vector with a reference acoustic model, classify patterns and process the vector into language based on a language model.

According to various embodiments, the storage 460 may store various programs and data for operating the electronic device 400. For example, the storage 460 may store identification information, location information and direction information of each of the external devices 20 to 50 in the vicinity of the electronic device 400. The storage 460 may store information on the output levels of the audio signals of the audio devices 30 and 50 which are periodically updated.

The storage unit 460 may include an internal memory and/or an external memory. The internal memory may include at least one of a volatile memory or a non-volatile memory. The volatile memory may be, for example, Dynamic RAM (DRAM), Static RAM (SRAM), Synchronous Dynamic RAM (SDRAM), or the like. The non-volatile memory may be, for example, One Time Programmable ROM (OTPROM), Programmable ROM (PROM), Erasable and Programmable ROM (EPROM), Electrically Erasable and Programmable ROM (EEPROM), mask ROM, flash ROM, NAN flash memory, NOR flash memory, and the like. In addition, the internal memory may be a Solid State Drive (SSD). The external memory may include flash drive, Compact Flash (CF), Secure Digital (SD), Micro Secure Digital (Micro-SD), Mini Secure Digital (Mini-SD), Extreme digital (Xd), memory stick, or the like. The external memory may be operatively coupled to the electronic device 400 via various interfaces. In addition, the electronic device 400 may further include a storage device such as a hard drive.

The display 440 may display a screen. The screen may include a reply screen for various contents such as image, video, text, and music, an application execution screen including various contents, a Graphic User Interface (GUI) screen, etc. As described below, the display 440 may be controlled by the processor 420 and display a guide GUI for guiding a user to utter a voice for controlling the electronic device 400 or the external devices 20 to 50.

The display 440 may be embodied with various kinds of displays such as liquid crystal display, thin film transistor-liquid crystal display, organic light-emitting diode, flexible display, three-dimensional display (3D display), or the like, but is not limited thereto. The display 440 may also be embodied as a touch screen.

The speaker 450 may convert an electronic audio signal into sound and output the sound. According to an embodiment, when the electronic device 400 is embodied as an audio device that outputs an audio signal, the electronic device 400 may include the speaker 450.

The camera 470 may capture an image outside the electronic device 400 according to a control of the processor 420. The camera 470 may be controlled by the processor 420 and capture an image including the user 10 upon receiving a predetermined user voice. The camera 470 may include various image sensors and lenses.

The processor 420 may include various processing circuitry and control the overall operation of electronic device 400. For example, the processor 420 may read various programs and data stored in the storage 460 and perform operation of the electronic device 400 according to various embodiments of the present disclosure. The processor 120 may include various processing circuitry, such as, for example, and without limitation, one or more of a dedicated processor, a central processing unit (CPU), a controller, an application processor (AP), a communication processor (CP), and/or an ARM processor, or the like.

According to an embodiment, after the electronic device 100 enters a voice control mode in accordance with a predetermined user voice, the processor 420 may control the display 440 to display the guide GUI for guiding the user to utter a voice for controlling the electronic device 100 or at least one of the external devices 20 to 50.

In other words, when the output levels of the audio signals output from the audio devices 30 and 50 is reduced as a predetermined user voice is recognized, and the electronic device 100 operates in the voice control mode, optimal conditions for recognizing a voice command from the user may be created. Therefore, the processor 420 may display a guide GUI on the display 440 and guide the user 10 to utter a voice command. The processor 420 may display a guide GUI in the form of text such as "please say words" "please utter a voice command", etc. or a GUI in the form of image such as a flashing image, but the present disclosure is not limited thereto.

According to an embodiment, after the electronic device 100 enters a voice control mode in accordance with a predetermined user voice, the processor 420 may control the speaker 450 to output a guide voice for guiding the user to utter a user voice for controlling the electronic device 100 or at least one of the external devices 20 to 50.

In FIGS. 1 to 3, it is exemplified that the output levels of audio signals output from the audio devices 30 and 50, among the external devices 20 to 50, are reduced in response to an audio signal corresponding to the predetermined user voice being received, but the present disclosure is not limited thereto. As described above, according to an embodiment, the electronic device 400 may be embodied as an audio device, and the electronic device 100 may output an audio signal through the speaker 450.

According to an embodiment, in response an audio signal corresponding to a predetermined user voice being received through the microphone 410 while an audio signal is output through the speaker 450, the processor 420 may control the electronic device 400 to reduce the output level of an audio signal output through the speaker 450.

As described in FIG. 2, the processor 420 may transmit a control command for reducing an output level of an audio signal to an audio device of which distance from the user 10 who utters the predetermined user voice is shorter than a predetermined distance, among the plurality of audio devices 30 and 50. In response to a predetermined user voice being received to the microphone 410, the processor 420 may control the camera 470 to obtain an image including the user 10.

In response to the image including the user 10 being obtained, the processor 420 may analyze the obtained image, determine the location of the user 10 and an audio device located within a predetermined distance from the location of the user 10 and transmit a control command for reducing an output level of an audio signal to the determined audio device.

The storage 460 may store identification information, location information and direction information of the audio devices 30 and 40 and the identification information may include shape information such as the images of the audio devices 30 and 50. The processor 420 may identify the determined audio device through image analysis based on the stored information and transmit a control command to the identified audio device.

According to an embodiment, the processor 420 may control the communicator 430 to perform communication with another electronic device performing communication with at least one external device. In response to a predetermined user voice being received through the microphone 410, the processor 420 may control the communicator 430 to transmit a control command for reducing an output level of the audio signal output from an audio device, among the external devices performing communication with another electronic device, to another electronic device.

Since another external device connected to another electronic device is not controlled by the electronic device 400, the processor 420 may transmit a control command for reducing an output level of an audio signal to another electronic device connected to another external device to control the operation thereof and thereby reduce an output level of the audio signal output from an audio device among the external devices.

According to an embodiment, the processor 420 may transmit a control command for reducing an output level of an audio signal only to an audio device of which audio output level is greater than a predetermined level, and this applies to another audio device connected to another electronic device in the same manner.

The processor 420 may transmit information of the external devices connected to the electronic device 400 to another electronic device and receive information of the external devices connected to another electronic device from another electronic device. The information of the external devices exchanged between the electronic device 400 and another electronic device may include identification information of the external devices. Accordingly, the processor 420 may identify an external device (particularly, an audio device) connected to another electronic device.

In response to a predetermined user voice being received through the microphone 410, the processor 420 may request information of the output level of the audio signal output from the audio device among the external devices connected to another electronic device to another electronic device. The another electronic device may request the information of the audio signal output level to the audio device connected thereto, receive the information and transmit the information to the electronic device 400.

The processor 420 may recognize an audio signal output level of the audio device connected to the another electronic device and determine the audio device connected to the another electronic device as a device to which a control command for reducing an output level of an audio signal is transmitted based the audio signal output level. The processor 420 may transmit a control command for reducing an output level of the audio signal along with the information of the determined audio device to another electronic device and thereby reduce the audio signal output level of the audio device connected to another electronic device.

According to an embodiment, the processor 420 may control the communicator 430 so that another electronic device may receive voice recognition accuracy of a predetermined user voice received through the microphone provided in another electronic device, compare the received voice recognition accuracy with voice recognition accuracy for a predetermined user voice received through the microphone 410 of the electronic device 400, and based on a comparison result, if the voice recognition accuracy for the predetermined user voice received through the microphone 410 is higher, transmit a control command for reducing output levels of the audio signals output from the audio devices 30 and 50, among the external devices 20 to 50, to the audio devices 30 and 50.

The processor 420 may exchange voice recognition accuracy for the predetermined user voice with another electronic device, and if the voice recognition accuracy of the electronic device 400 is higher than the voice recognition accuracy of another electronic device, control the communicator 430 to transmit control signals for reducing output levels of the audio signals to the audio devices 30 and 50 connected to the electronic device 400.

For example, in the case where a plurality of electronic devices each connected external devices are located in the same place (e.g., in a home or in an office), when the user 10 utters a predetermined user voice in the place, each of the plurality of electronics may receive a predetermined user voice uttered by a user through the microphone provided in each of the plurality of electronic devices and perform voice recognition for an audio signal corresponding to the predetermined user voice. Each of the plurality of electronic devices may evaluate the quality of the recognized voice using a technique well-known to the public and calculate (determine) the quality of the recognized voice into voice recognition accuracy or voice recognition reliability.

According to an embodiment, external devices may be connected to an electronic device via the Near Field communication method. Therefore, the external devices connected to each electronic device may be disposed closer to the connected electronic device rather than another electronic device. In a general sense, as a distance between the user 10 and the electronic device is reduced, the voice recognition accuracy is increased. Therefore, it is determined that the electronic device having higher voice recognition accuracy with respect to the same predetermined user voice is closer to the user 10.

Therefore, it is assumed that distances between the user and audio devices connected to an electronic device close to the user are shorter than distances between the user and other audio devices connected to another electronic device. In addition, audio signals output from an audio device closer to the user further interferes with voice recognition rather than audio signals output from an audio signal distant from the user. Therefore, as in the above-described embodiment of the present disclosure, reducing output levels of audio signals of the connected audio device by an electronic device having higher voice recognition accuracy than another electronic device may be more effective than reducing output levels of audio signals of the connected audio device by another electronic device having lower voice recognition accuracy.

According to another embodiment of the present disclosure, in response to a predetermined signal being received from a remote control device as a predetermined button provided in a remote control device (not shown) which controls the electronic device 100 is selected, the processor 420 may transmit control commands for reducing output levels of audio signals output from the audio devices 30 and 50 among the external devices 20 to 50.

As described above, it is exemplified that the electronic device 100 transmits control commands for reducing output levels of the audio signals to the audio devices 30 and 50 and an audio signal corresponding to a predetermined user voice is received through the microphone 410 to operate the electronic device 100 in the voice control mode. However, according to an embodiment, the electronic device 100 may operate in the voice control mode even when a predetermined signal is received from a remote control device (not shown) that performs communication with the electronic device through the communicator 430.

The remote control device may, for example, and without limitation, be embodied as a remote controller, a smart phone, or the like. When the remote control device is a remote controller, in response to a predetermined button provide in the remote controller being selected by the user, a predetermined signal may be transmitted to the communicator 430 via a the infrared communication method, and when the remote control device is a smart phone, in response to a predetermined object displayed on an execution screen of a remote control application provided in the smart phone being selected by the user, a predetermined signal may be transmitted to the communicator 430 via a Bluetooth communication method.

Figure 5:
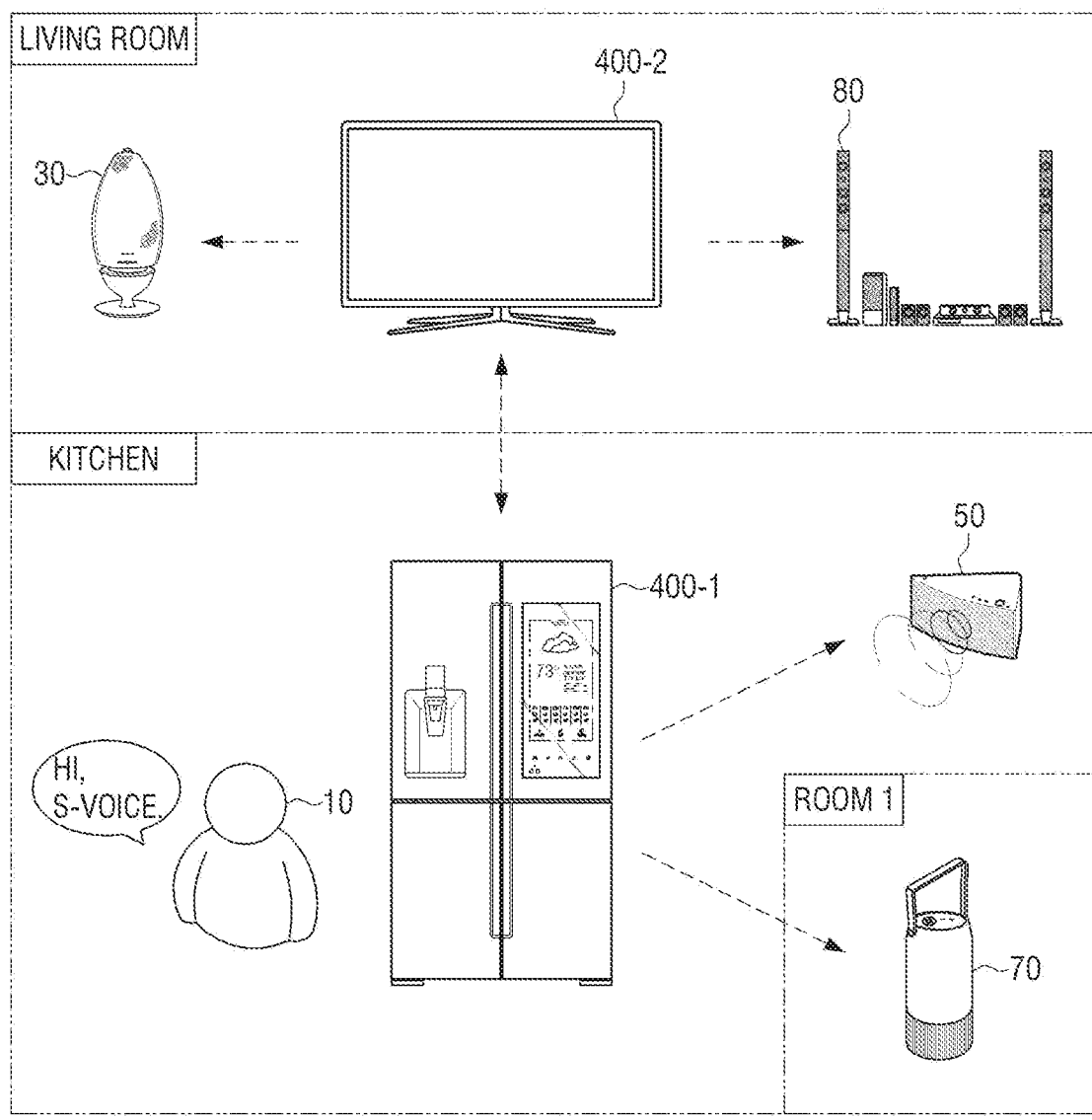
FIG. 5 is diagram illustrating an example voice recognition environment including a plurality of electronic devices according to an embodiment of the present disclosure.

FIG. 5 is a diagram illustrating an example voice recognition environment including a plurality of electronic devices according to an example embodiment of the present disclosure. Referring to FIG. 5, it is assumed that a smart refrigerator 400-1 is the electronic device 400 of FIG. 4 and a smart TV 400-2 is another electronic device.

Referring to FIG. 5, the smart refrigerator 400-1 may be connected to the MP3 speaker 50, which is an audio device in the kitchen, and a bottle type speaker 70, which is an audio device in room 1, and the smart TV 400-2, another electronic device, may be connected to the 360 degree speaker 30 and the home theater 80 in the living room, thereby creating the IoT environment in the home. The audio devices 50, 70, 30 and 80 may output audio signals.

When the user 10 utters a predetermined user voice "Hi, S-Voice" in the kitchen, since the living room and the kitchen are open space, the smart refrigerator 400-1 and the smart TV 400-2 each may receive an audio signal corresponding to a predetermined user voice uttered by the user through its microphone, process the received audio signal and perform voice recognition. According to an embodiment, each of the smart refrigerator 400-1 and the smart TV 400-2 may calculate (determine) voice recognition accuracy for the recognized predetermined user voices and exchange the calculated (determined) voice recognition accuracy with each other. Referring to FIG. 5, since the smart refrigerator 400-1 is closer to the user 10 than the smart TV 400-2, the voice recognition accuracy of the smart refrigerator 400-1 may be high or greater than that associated with the smart TV 400-2.

Since voice recognition accuracy for the predetermined user voice recognized by the smart refrigerator 400-1 is higher than the voice recognition accuracy of the smart TV 400-2, the smart refrigerator 400-1 may transmit control commands for reducing output levels of audio signals to the MP3 speaker 50 and the bottle type speaker 70 connected thereto and operate in the voice control mode. According to an embodiment, the smart refrigerator 400-1 may display a guide GUI for guiding a user to utter a voice command or output a guide voice. As a result, a user may utter a voice command for controlling the operation of the smart refrigerator 400-1, the smart TV 400-2 or at least one of the audio devices 50, 70, 30 and 80 to control the operation thereof.

According to an embodiment, the smart refrigerator 400-1 may transmit a control command for reducing an output level of an audio signal to the smart TV 400-2 and reduce an output level of an audio signal output from the smart TV 400-2. Alternatively, the smart refrigerator 400-1 may transmit a control command for reducing an output level of an audio signal along with information on the 360 degree speaker 30 and the home theater 80 to the smart TV 400-2 and reduce output levels of audio signals of the audio devices 30 and 80 connected to the smart TV 400-2.

As described above, various embodiments of the present disclosure are applied to different cases. For example, a user may listen to music by accessing music streaming service of a mobile phone while driving a vehicle. The streamed music may be output through the speaker of the vehicle via Bluetooth communication, etc.

When a user utters a predetermined user voice to trigger a voice recognition function for controlling the operation of the vehicle by voice, an On-Board Unit (OBU) including the voice recognition function may recognize the predetermined user voice, transmit a control command (e.g. a mute command) for reducing an output level of the audio signal to the mobile phone streaming music. Accordingly, the streaming server of the mobile phone is temporarily paused, and the user may control the operation of the vehicle through the voice command. After controlling the operation of the vehicle through the voice is completed, the OBU may transmit a control command (e.g. a come-back command) for increasing the output level of the audio signal to the mobile phone, and thus the mobile phone may restart the stopped streaming service through the speaker.

According to another embodiment, when a user watches a movie on TV equipped with a voice recognition function in the living room, movie sounds may be reproduced through the home theater connected to the TV. Although the user tries to control various devices connected to the TV through the TV by voice, since the user is away from the TV, and the home theater outputs movie sounds near the TV, the voice recognition function in the TV may not properly operate.

In this case, the user may user a voice recognition function in the mobile phone close to the user. In other words, when the user utters a predetermined user voice, the mobile phone may recognize the predetermined user voice, transmit a volume down command or a mute command for the home theater to the TV and thereby reduce of mute the volume of and the sound output from the home theater. After performing the operation according to the voice command of the user, the mobile phone may transmit a volume up command for the home theater to the TV and restore the movie sound level to its original level.

Figure 6:
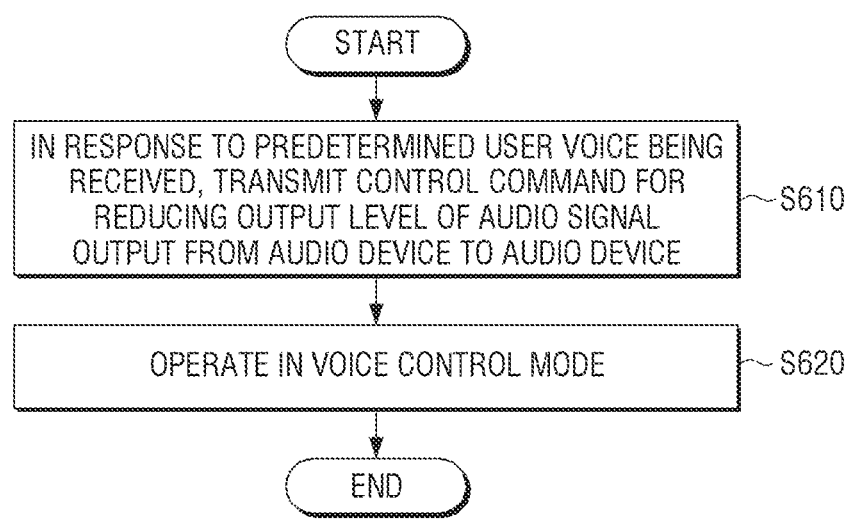
FIG. 6 is a flowchart illustrating an example controlling method for an electronic device according to an embodiment of the present disclosure.

FIG. 6 is a flowchart illustrating an example method for controlling an electronic device according to an embodiment of the present disclosure.

Referring to FIG. 6, in response to an audio signal corresponding to a predetermined user voice being received through at least one microphone, the electronic devices 100 and 400 may transmit a control command for reducing an output level of an audio signal output from an audio device from among at least one external device to the audio device at operation S610.

For example, the electronic devices 100 and 400 may determine at least one audio device to which a control command for reducing an output level is transmitted, among a plurality of audio devices, based on output level information on audio signals of a plurality of audio devices which are received through the microphone or audio signals transmitted to the plurality of audio devices, and transmit a control command for reducing an output level to the determined audio device.

The electronic devices 100 and 400 may transmit control a command for reducing an output level of an audio signal to an audio device of which output level is greater than a predetermined level, among a plurality of audio devices.

In response to an audio signal corresponding to a predetermined user voice being received through a microphone while the electronic devices 100 and 400 output an audio signal, the electronic devices 100 and 400 may reduce an output level of the audio signal output from the electronic devices 100 and 400.

The electronic devices 100 and 400 may perform communication with a remote control device which controls an electronic device, and in response to a predetermined signal being received from the remote control device as a predetermined button provided in the remote control device is selected, transmit a control command for reducing an output level of an audio signal output from an audio device, among the external devices, to the audio device.

After transmitting the control command for reducing the audio signal output level of the audio device to the audio device, the electronic devices 100 and 400 may operate in the voice control mode where the electronic device is controlled by the user voice at step S620. After entering the voice control mode according to the predetermined user voice, the electronic devices 100 and 400 may display a guide UI for guiding a user to utter a voice for controlling an electronic device or an external device.

In response to receiving an audio signal corresponding to a user voice for controlling the electronic devices 100 and 400 or the external devices through the microphone in the voice control mode, the electronic devices 100 and 400 may control the electronic device based on the audio signal corresponding to the user voice and transmit the control command for increasing the output level of the audio signal output from the audio device to the audio device, thereby restoring the output level of the audio signal output from the audio device to its original level.

According to an embodiment, the electronic devices 100 and 400 may perform communication with another electronic device that performs communication with at least one other external device, and in response to an audio signal corresponding to a predetermined user voice being received through the microphone, transmit the control command for reducing the output level of the audio signal output from the audio device, among the external devices that perform communication with another electronic device, to another electronic device.

The electronic devices 100 and 400 may include a first microphone and perform communication with another electronic device that performs communication with at least one external device, and in response to voice recognition accuracy for the predetermined user voice that another electronic device receives through the first microphone being received from another electronic device, compare the received voice recognition accuracy with voice recognition accuracy for the predetermined user voice received through a second microphone of the electronic device, and as a result of comparison, if the voice recognition accuracy for the user voice received through the second microphone is higher, transmit the control command for reducing the output level of the audio signal output from the audio device, among the external devices, to the audio device.

Figure 7:
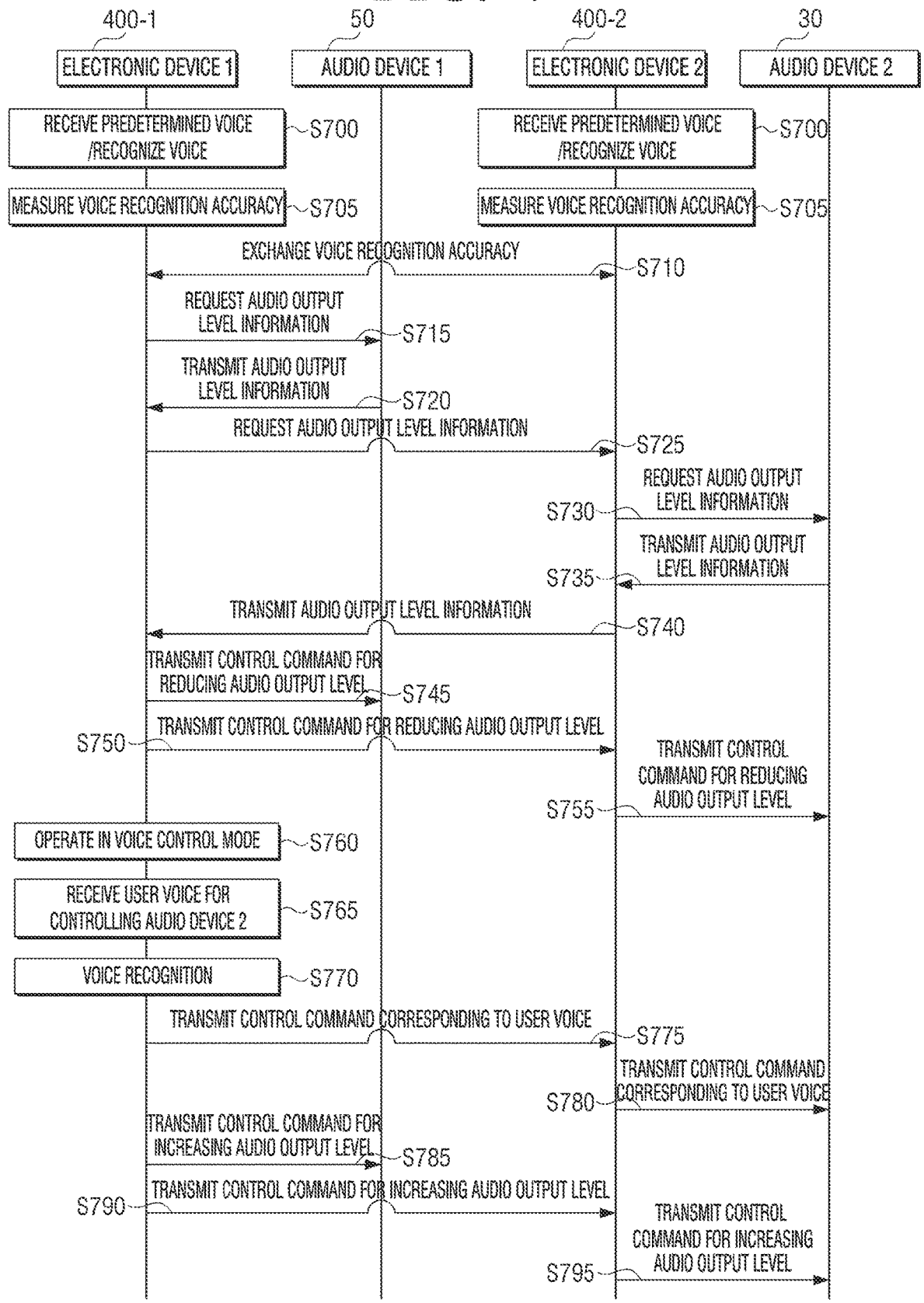
FIG. 7 is a sequence diagram illustrating an example operation of a voice control system according to an embodiment of the present disclosure.

FIG. 7 is a sequence diagram illustrating an example operation of a voice control system according to an example embodiment of the present disclosure. Referring to FIG. 7, the electronic device 1 400-1 is connected to an audio device 1 50 and the electronic device 2 400-2 may be connected to an audio device 2 30, and the audio devices 30 and 50 may output audio signals. Although not shown, the electronic devices 400-1 and 400-2 may further connect to other external devices.

Referring to FIG. 7, when a user utters a predetermined user voice for controlling the operations of the electronic devices 400-1 and 400-2 or the devices connected to the electronic devices 400-1 and 400-2 through the electronic devices 400-1 and 400-2, the electronic devices 400-1 and 400-2 may receive predetermined user voices through the microphones provided in the electronic devices 400-1 and 400-2, perform voice recognition for the received user voice at step S700, measure voice recognition accuracy for the recognized voice at step S705 and exchange the measured voice recognition accuracy at step S710.

If voice recognition accuracy for a predetermined user voice measured by the electronic device 1 400-1 is higher than voice recognition accuracy for a predetermined user voice measured by the electronic device 2 400-2, the electronic device 1 400-1 may request audio output level information to the audio device 1 50 at step S715 and receive audio output level information of the audio signal output from the audio device 1 50 from the audio device 1 to at step S720.

The electronic device 1 400-1 may request audio output level information to the electronic device 2 400-2 to obtain the audio output level information of the audio device 2 30 connected to the electronic device 2 400-2 at step S725. The electronic device 2 400-2 may request audio output level information to the audio device 2 30 at step S730, and in response to the audio output level information of the audio signal output from the audio device 2 30 being received at step S735, transmit the received audio output level information of the audio device 2 30 to the electronic device 1 400-1 at step S740.

The electronic device 1 400-1 may recognize the audio signal output level information of the audio devices 50 and 30 which output audio signals in the voice recognition environment and determine an audio device to which a control command for reducing an output level of the audio signal is transmitted based on the audio signal output level information.

If it is desired that audio signal output levels of the audio devices 1 and 2 50 and 30 are reduced, as shown in FIG. 7, the electronic device 1 400-1 may transmit a control command for reducing an output level of the audio signal to the audio device 1 50 connected to the electronic device 400-1 or the electronic device 2 400-2 connected to the audio device 2 30 at steps S745 and S750. The control command transmitted to the electronic device 2 400-2 may include identification information of the audio device 2 30. The electronic device 2 400-2 which receives the control command for reducing the output level of the audio signal from the electronic device 1 400-1 may transmit the control command for reducing the output level of the audio signal to the audio device 2 30 at step S755.

The electronic device 1 400-1 may operate in the voice control mode after transmitting a control command for reducing the output level of the audio signal to each of the audio devices 50 and 30 at step S760. According to an embodiment, the electronic device 1 400-1 may alarm the user to guide to utter a voice command.

In response to a user voice command for controlling the operation of the audio device 2 30 being received when the electronic device operates in the voice control mode at step S765, the electronic device 1 400-1 may recognize the received user voice command at step S770, and transmit a control command corresponding to the user voice to the electronic device 2 400-2 for controlling the operation of the audio device 2 30 at step S775. The control command corresponding to the user voice may include the identification information of the controlled device, the audio device 2 30. Accordingly, the electronic device 2 400-2 may transmit a control command corresponding to the user voice to the audio device 2 30 at step S780 and the audio device 2 30 may operate according to a control command corresponding to the user voice.

The electronic device 1 400-1 may transmit control commands for increasing audio signal output levels to the audio device 1 50 and the electronic device 2 400-2 at steps S785 and S790, and the electronic device 2 400-2 may transmit a control command for increasing an audio device output level to the audio device 2 30 at step S795. Therefore, the electronic device 1 400-1 may restore audio signal output levels of the audio devices 50 and 30.

It is exemplified that the electronic devices 100 and 400 directly control the operations of the external devices connected to the electronic devices 100 and 400, but the present disclosure is not limited thereto. According to an embodiment, the external devices may be directly connected to the voice recognition server 200 via a network such as the Internet, and the voice recognition server 200 may directly control the operations of the external devices connected via the network based on the recognized user voice. The technical spirit of the present disclosure may be employed in this case.

It is illustrated that the electronic devices 100 and 400 control the output levels of the audio signals output from the audio device connected to the electronic devices 100 and 400 and create the optimal voice recognition environment, but is not limited thereto.

Since the electronic devices 100 and 400 obtain information regarding sound sources output from the audio device via various networks such as the Internet, or directly obtain the information from the connected audio device. Therefore, according to an embodiment, the electronic devices 100 and 300 may output antiphase sound of the audio signal output from the audio device and offset the audio signal of the audio device, thereby creating the optimal voice recognition environment.

In response to a trigger voice of the user being received while the audio device outputs an audio signal, the electronic devices 100 and 400 may operate in the voice control mode and output antiphase sound of the audio signal output from the audio device during a predetermined period of time (e.g. a time for a user to utter a control command after a trigger voice is received). The information on the sound source of the audio signal output from the audio device may be directly obtained from the external server which manages information on various sound sources or the audio device.

If the user utters a voice for controlling the electronic devices 100 and 400 and the audio device, the electronic devices 100 and 300 may operate according to the user voice. In this case, the electronic devices 100 and 400 may create the optimal voice recognition environment without controlling the audio signal output level of the audio device.

According to various embodiments, although an audio device outputs audio sounds in the vicinity of a user or an electronic device, the voice recognition function of the electronic device may be enhanced.

The operations of the processors 120 and 420 of the electronic devices 100 and 400 and the controlling method for the electronic devices 100 and 400 according to the above various embodiments may be embodied as a software program and loaded on the server 100.

For example, a non-transitory computer readable medium storing the program may be disposed in the electronic devices 100 and 400, the program performing a controlling method of the electronic devices 100 and 400 including the step of, in response to an audio signal corresponding to a predetermined user voice being received through at least one microphone, transmitting a control command for reducing an output level of an audio signal output from an audio device from among at least one external device, and the step that electronic device operates in the voice control mode to be controlled by the user voice, and a controlling method of the electronic devices 100 and 400 including the step of, in response to an audio signal corresponding to a user voice for controlling the electronic device or the external device through the microphone being received when the electronic device operates in the voice control mode, controlling the electronic device based on the audio signal corresponding to the user voice and the step of transmitting a control command for increasing the output level of the audio signal output from the audio device to the audio device.

The non-transitory recordable medium refers to a medium which may store data. For example, the above-described various middlewares or programs may be stored in the non-transitory readable medium may be CD, DVD, hard disk, Blu-ray disk, USB, memory card, ROM, or the like, and provided therein.

Although various example embodiments have been illustrated and described, it will be appreciated by those skilled in the art that changes may be made to these example embodiments without departing from the principles and spirit of the present disclosure. Accordingly, the scope of the present disclosure is not limited to the described example embodiments, but is defined by the appended claims as well as equivalents thereto.

What is claimed is:

1. An electronic apparatus comprising:
a microphone;
a communicator comprising communication circuitry;

at least one processor, comprising processing circuitry; and memory storing instructions that, when executed by the at least one processor individually or collectively, cause the electronic device to:

based on a first user voice being received through the microphone, obtain a first voice recognition accuracy of the user voice, receive, through the communicator, a second voice recognition accuracy of the first user voice from another electronic device, compare the first voice recognition accuracy and the second voice recognition accuracy, to determine a comparison result, and based on the comparison result, transmit a first command for reducing output level of an audio device to the audio device through the communicator and operate in a voice control mode.

2. The electronic apparatus as claimed in claim 1, wherein at least one processor is individually and/or collectively configured to, based on the first voice recognition accuracy being greater that the second voice recognition accuracy, operate in the voice control mode.

3. The electronic apparatus as claimed in claim 1, wherein the first user voice is a trigger word for allowing the electronic apparatus to enter the voice control mode.

4. The electronic apparatus as claimed in claim 1, wherein at least one processor is individually and/or collectively configured to, based on the first user voice including a trigger word, transmit to the other electronic device a request for the second voice recognition accuracy of the first user voice.

5. The electronic apparatus as claimed in claim 1, wherein at least one processor is individually and/or collectively configured to:

receive a second user voice through the microphone while operating in the voice control mode, perform an operation of the electronic apparatus based on the second user voice, and transmit a second command for restoring the output level of the audio device to the audio device through the communicator.

6. The electronic apparatus as claimed in claim 5, wherein at least one processor is individually and/or collectively configured to:

based on the second user voice being received through the microphone, transmit the second user voice to a server through the communicator, receive a voice recognition result corresponding to the second user voice from the server through the communicator, and perform the operation of the electronic apparatus based on the voice recognition result.

7. The electronic apparatus as claimed in claim 1, wherein the other electronic device is a device within an IoT environment with the electronic apparatus.

8. A method for controlling an electronic apparatus, the method comprising:

based on a first user voice being received, obtaining a first voice recognition accuracy of the user voice;

receiving a second voice recognition accuracy of the first user voice from another electronic device;

comparing the first voice recognition accuracy and the second voice recognition accuracy, to determine a comparison result; and based on the comparison result, transmitting a first command for reducing output level of an audio device to the audio device and operating in a voice control mode.

9. The method as claimed in claim 8, wherein the operating comprises, based on the first voice recognition accuracy being greater that the second voice recognition accuracy, operating in the voice control mode.

10. The method as claimed in claim 8, wherein the first user voice is a trigger word for allowing the electronic apparatus to enter the voice control mode.

11. The method as claimed in claim 8, further comprising based on the first user voice including a trigger word, transmit to the other electronic device a request for the second voice recognition accuracy of the first user voice.

12. The method as claimed in claim 8, further comprising:

receiving a second user voice while operating in the voice control mode;

performing an operation of the electronic apparatus based on the second user voice; and transmitting a second command for restoring the output level of the audio device to the audio device.

13. The method as claimed in claim 12, wherein the performing comprises:

based on the second user voice being received, transmitting the second user voice to a server;

receiving a voice recognition result corresponding to the second user voice from the server; and performing the operation of the electronic apparatus based on the voice recognition result.

14. The method as claimed in claim 8, wherein the other electronic device is a device within an IoT environment with the electronic apparatus.

* * * * *